(12) United States Patent
Pietschner et al.

(10) Patent No.: US 11,130,079 B2
(45) Date of Patent: Sep. 28, 2021

(54) FILTER INSERT OF A FUEL FILTER, FILTER INSERT, AND FUEL FILTER

(71) Applicant: HENGST SE, Münster (DE)

(72) Inventors: Sieghard Pietschner, Greven (DE); Moritz Dorschel, Münster (DE); Marcus Wegmann, Ostbevern (DE); Andreas Schüttpelz, Osnabrück (DE)

(73) Assignee: HENGST SE, Münster (DE)

( * ) Notice: Subject to any disclaimer, the term of this patent is extended or adjusted under 35 U.S.C. 154(b) by 168 days.

(21) Appl. No.: 16/080,951

(22) PCT Filed: Feb. 23, 2017

(86) PCT No.: PCT/EP2017/054161
§ 371 (c)(1),
(2) Date: Aug. 29, 2018

(87) PCT Pub. No.: WO2017/148790
PCT Pub. Date: Sep. 8, 2017

(65) Prior Publication Data
US 2019/0105587 A1 Apr. 11, 2019

(30) Foreign Application Priority Data
Feb. 29, 2016 (DE) .................... 10 2016 103 561.0

(51) Int. Cl.
| | |
|---|---|
| *B01D 29/21* | (2006.01) |
| *B01D 39/16* | (2006.01) |
| *B01D 39/18* | (2006.01) |
| *B01D 17/04* | (2006.01) |
| *B01D 36/00* | (2006.01) |
| *B01D 29/58* | (2006.01) |

(52) U.S. Cl.
CPC .......... *B01D 29/21* (2013.01); *B01D 17/045* (2013.01); *B01D 29/58* (2013.01); *B01D 36/003* (2013.01);
(Continued)

(58) Field of Classification Search
CPC ...... B01D 17/00; B01D 17/04; B01D 17/045; B01D 17/02; B01D 29/00; B01D 29/58;
(Continued)

(56) References Cited

U.S. PATENT DOCUMENTS

| | | | |
|---|---|---|---|
| 3,262,578 A | 7/1966 | Dennis | |
| 6,569,330 B1 * | 5/2003 | Sprenger | ................ B01D 29/54 210/315 |

(Continued)

FOREIGN PATENT DOCUMENTS

| | | |
|---|---|---|
| WO | 2015015192 A1 | 2/2015 |
| WO | 2015140626 A1 | 9/2015 |

OTHER PUBLICATIONS

"Laminating": What is laminating? Available online Aug. 31, 2014 by Plastics International. https://www.plasticsintl.com/blog/what-is-laminating/ (Year: 2014).*
(Continued)

*Primary Examiner* — Clare M Perrin
(74) *Attorney, Agent, or Firm* — Greer, Burns & Crain, Ltd.

(57) ABSTRACT

A filter material for a filter insert of a fuel filter for separating solid particles and water droplets from fuel. The filter material comprises a particle filter medium layer through which the fuel flows first during use and at least one coalescer medium layer which lies on the particle filter medium layer on the outflow side. At least one coalescer medium layer is gradient-free in the flow direction with respect to the geometrical structure and/or physical properties and/or chemical properties of the layers. The at least one coalescer medium layer has a thickness measured in the flow direction which is maximally as large as the thickness of the particle filter medium layer measured in the flow direction.

16 Claims, 1 Drawing Sheet

(52) U.S. Cl.
CPC ....... *B01D 39/163* (2013.01); *B01D 39/1615* (2013.01); *B01D 39/1623* (2013.01); *B01D 39/18* (2013.01); *B01D 2239/0421* (2013.01); *B01D 2239/065* (2013.01); *B01D 2239/0622* (2013.01); *B01D 2239/1216* (2013.01); *B01D 2239/1233* (2013.01); *B01D 2239/1258* (2013.01)

(58) Field of Classification Search
CPC ........ B01D 35/00; B01D 39/00; B01D 39/10; B01D 39/12; B01D 39/14; B01D 69/08; B01D 69/10; B01D 71/00; B01D 71/02; B01D 71/022; B01D 2201/00; B01D 2201/12; B01D 2201/127; B01D 2201/29; B01D 2201/291; B01D 2201/301; B01D 2201/307; B01D 2201/32; B01D 2201/325; B01D 2257/702; B01D 2257/704; C02F 1/00; C02F 1/001; C02F 2101/30; C02F 2101/301; C02F 2101/32; C02F 2101/322; C02F 2103/00; C02F 2103/001; C02F 2103/007; C02F 2103/008; C02F 2103/06; Y10S 210/05
See application file for complete search history.

(56) References Cited

U.S. PATENT DOCUMENTS

| | | | |
|---|---|---|---|
| 8,524,081 B2 * | 9/2013 | Stanfel | F02M 37/24 210/307 |
| 2007/0039865 A1 * | 2/2007 | Jiang | B01D 36/003 210/259 |
| 2007/0084776 A1 * | 4/2007 | Sasur | B01D 39/1623 210/314 |
| 2008/0053888 A1 * | 3/2008 | Ellis | B01D 36/003 210/338 |
| 2011/0233152 A1 * | 9/2011 | Wieczorek | B01D 17/045 210/799 |
| 2014/0034580 A1 * | 2/2014 | Chen | C10G 31/09 210/708 |
| 2014/0311963 A1 * | 10/2014 | Bortnik | B01D 29/232 210/335 |
| 2016/0228794 A1 * | 8/2016 | Perkins | B01D 39/2017 |
| 2017/0218894 A1 | 8/2017 | Girondi | |

OTHER PUBLICATIONS

PCT Preliminary Report; priority document.
German Search Report; priority document.

* cited by examiner

FILTER INSERT OF A FUEL FILTER, FILTER INSERT, AND FUEL FILTER

CROSS-REFERENCES TO RELATED APPLICATIONS

This application claims the benefit of the International Application No. PCT/EP2017/054161, filed on Feb. 23, 2017, and of the German patent application No. 10 2016 103 561.0 filed on Feb. 29, 2016, the entire disclosures of which are incorporated herein by way of reference.

BACKGROUND OF THE INVENTION

The present invention relates to a filter insert of a fuel filter for separating solid particles and water droplets from fuel, the filter insert having at least one filter material body made of a filter material, the filter material being made up of a particle filter medium layer through which the fuel first flows during use and at least one coalescing medium layer situated on the particle filter medium layer at the downstream side. Moreover, the present invention relates to a fuel filter.

A filter insert of the type named above is known from WO2015/140 626 A1. This document discloses a filter insert of a fuel filter for separating solid particles and water droplets from fuel, the filter insert having at least one filter material body made of a filter material, the filter material being made up of a particle filter medium layer and at least one coalescing medium layer lying on the particle filter medium layer. The coalescing medium layer has a thickness, measured in the direction of flow, that can be as large as the thickness, measured in the direction of flow, of the particle filter medium layer, for example a thickness between 0.5 and 1 mm. The coalescing medium layer is made of a material having a low hydrophilicity, and the coalescing medium layer can act as a spacer between the folds of the particle filter medium layer.

In this existing art, the high manufacturing outlay and the large requirement of coalescing medium per surface unit of the filter material are regarded as disadvantageous.

From the document WO 2007/041 559 A2, a fuel filter is known. In this filter, the particle filter medium layer is made of cellulose fibers. The coalescing medium layer is made of hydrophilic synthetic fibers that have an average diameter that becomes larger in the direction of flow. In order to achieve a high degree of water separation, here a coalescing medium layer is proposed that is relatively thick relative to the particle filter medium layer, in order to achieve as long as possible a dwell time of the water droplets in the coalescing medium layer.

In the known filter material, it is seen as disadvantageous that, on the one hand, its production is expensive because the coalescing medium layer made of synthetic fibers has to have a gradient of its average fiber diameter running in the direction of flow in the sense that the average fiber diameter increases in this direction, and on the other hand the coalescing medium layer is supposed to be relatively thick relative to the particle filter medium layer, which results in a requirement for a large amount of coalescing medium and a large space for housing it.

SUMMARY OF THE INVENTION

For the present invention, an object therefore arises of providing a filter insert of the type named above that avoids the indicated disadvantages and, in particular, can be produced with a low production outlay, and requires a smaller quantity of coalescing medium per surface unit of the filter material, and less space for housing it. Moreover, a corresponding fuel filter is provided.

The solution of the first part of the object, relating to the filter insert, is achieved according to the present invention by a filter insert of the type named above that is characterized in that the coalescing medium layer, or a configuration of a plurality of coalescing medium layers, has a specifiable minimum hydrophilicity, the degree of hydrophilicity corresponding, according to the water repellency test, to an isopropanol volume portion of 25%, preferably 20%, more preferably 15%, and that the coalescing medium layer, or the configuration of a plurality of coalescing medium layers, is made without a gradient with regard to its geometrical structure and/or its physical properties and/or its chemical properties in the direction of flow, and that the coalescing medium layer, or the configuration of a plurality of coalescing medium layers, has a thickness, measured in the direction of flow, that is smaller than the thickness, measured in the direction of flow, of the particle filter medium layer, and that the filter material is folded in a zigzag shape to form a hollow cylindrical or cuboidal body, and that the coalescing medium layer, or the configuration of a plurality of coalescing medium layers, has a thickness between 0.1 and 1.5 mm, preferably between 0.2 and 0.6 mm, and that at a side, situated downstream, of the folded filter material, the coalescing medium layer, or configuration of a plurality of coalescing medium layers, acts as a spacer between the folds of the particle filter medium layer.

Advantageously, in the filter insert according to the present invention the coalescing medium layer, or the configuration of a plurality of coalescing medium layers, is easy to produce with regard to manufacturing technology, because it is made without a gradient in the direction of flow with regard to its geometrical structure and/or its physical properties and/or its chemical properties. In this way, a lower-cost material can be used for the coalescing medium layer or coalescing medium layers, reducing the costs of the filter material.

In the present context, a realization without a gradient means that the relevant property or the relevant properties of the coalescing medium have no changes over the thickness, regarded in the direction of flow, of the coalescing medium layer or layers that are more than a small amount that is practically not relevant for the separation effect. Slight changes in the coalescing medium, seen over its thickness, may, for example, necessarily arise in the course of a production process, but do not have any influence on the separation effect of the coalescing medium. An additional thin protective layer that may be present on one or both flat sides of the coalescing medium layer(s) should here not be understood as a layer causing or representing a gradient, because such a protective layer forms only a mechanical protection, e.g., against fraying or fuzzing of the actual coalescing medium layer(s) during its handling and processing and during filter operation, without influencing the separation effect.

Because the coalescing material, or the layers of the coalescing material, are at least partly yielding, given the use of corresponding materials, in order to ensure comparable values the measurement of the thickness values indicated above of the coalescing medium layer or of the configuration of a plurality of coalescing medium layers is usefully carried out according to DIN ISO 534, here specifically with an applied pressure of 12.5 kPa and a test surface of 2 $cm^2$.

Due to the fact that at the downstream side of the folded filter material the thin coalescing medium layer, or configuration of a plurality of coalescing medium layers, additionally acts as a spacer between the folds of the particle filter medium layer, a high folding density is enabled that does not have to be less than is the case for filter materials made up of only one particle filter medium layer.

In addition, it is advantageous that a smaller quantity of coalescing medium has to be used per surface unit of the filter material, because the coalescing medium layer, or the configuration of a plurality of coalescing medium layers, has a thickness, measured in the direction of flow, that is smaller than the thickness, measured in the direction of flow, of the particle filter medium layer.

In addition, a good coalescing effect is provided by the fact that the, or each, coalescing medium layer has a specifiable minimum hydrophilicity, indicated above. The water repellency test, also called the "3M" test, is not standardized, but, based on an oil repellency test according to DIN ISO 14419, is used to define a degree of hydrophilicity for a medium. The basis of the water repellency test is a plurality of liquid mixtures of water with different volume portions of isopropanol. The water repellency is determined or defined in that drops of the liquid mixtures are added to the medium. The liquid mixture, whose drops do not yet wet the medium, defines the water repellency and thus the degree of hydrophilicity of the medium. The greater the isopropanol volume portion is, the less hydrophilic is the medium being tested.

Despite the simpler coalescing medium, and despite the relatively small thickness of the coalescing medium layer or of the configuration of a plurality of coalescing medium layers, the filter insert according to the present invention ensures an effective filtering of fuel containing solid particles and water droplets. This good filter effect of the filter material is based on the recognition that, within the filter material, the particle filter medium layer not only retains the solid particles, but also at the same time forms an effective preliminary stage for the separation of water particles from the fuel, in which the originally small water droplets are coalesced to form less small water droplets or water films or collections of drops. This effect of the particle filter medium layer also occurs given the use of more commonly used particle filter media, both hydrophilic and hydrophobic. The coalescing medium layer, or configuration of a plurality of coalescing medium layers, then only has to coalesce the already larger water droplets or water films, coming from the particle filter medium layer together with the stream of fuel, to finally form sufficiently large drops of water, and to drain them inside the coalescing medium layer or layers via gravity and/or to emit them with the fuel stream, so that after exiting the coalescing medium layer or the configuration of a plurality of coalescing medium layers they are then separated from the fuel stream in a known manner, e.g., by gravity and/or sieving, and are separately carried away or collected. For this final coalescing, or for the final generation of relatively large drops of water and their draining and/or emission into the clean-side fuel phase, according to the present invention a relatively thin thickness, less than the thickness of the particle filter medium layer, of the coalescing medium layer or configuration of a plurality of coalescing medium layers is adequate.

In the filter material according to the present invention, there occurs a synergy effect with regard to the separation of the water droplets from the fuel, because experimental trials by the inventors have shown that when there is a separate configuration of the thin coalescing medium layer or layers at a distance from the particle filter medium layer, i.e., without the coalescing medium layer or layers being immediately connected to the particle filter medium, in the filter system formed in this way, in comparison to a filter system having the filter material according to the present invention, no effective coalescence occurs, and thus an adequate water separation effect also does not occur.

In order to achieve a large usable surface for the coalescing in the coalescing medium, in a further embodiment of the present invention it is preferably provided that the, or each, coalescing medium layer is made of a fiber material. Alternatively, the, or each, coalescing medium layer can also be made of a foam material or sintered material, having corresponding properties.

Also preferably, here the, or each, coalescing medium layer is made of a meltblown nonwoven, or a wet-laid nonwoven, or a woven fabric, or a felt.

The, or each, coalescing medium layer is preferably made of synthetic fibers, preferably polyester fibers, more preferably polyamide fibers, or of hydrophilic fibers, preferably cellulose, natural wool, or natural fibers, because these materials have the properties required for the coalescing process and are available at low cost. The synthetic fibers can be treated fibers in order to increase the degree of their hydrophilicity or to set it to a desired value.

As mentioned above, the coalescing medium layer, or the configuration of a plurality of coalescing medium layers, is made without a gradient in the direction of flow with regard to its geometrical structure and/or its physical properties and/or its chemical properties. A specific embodiment in this regard provides that the coalescing medium layer or the configuration of a plurality of coalescing medium layers are formed without a gradient with regard to their fiber thickness and/or their fiber density and/or their porosity and/or their pore diameter and/or their air permeability and/or their permeability and/or a treatment and/or their surface energy and/or their hydrophilicity. Here, the coalescing medium layer, or the configuration of a plurality of coalescing medium layers, can be made without a gradient in all, or a plurality of, or only one of the above-named properties or parameters.

For an effective coalescing effect in the coalescing medium layer or layers, it is advantageous if the fibers of the, or each, coalescing medium layer have a fiber diameter between 0.3 and 50 µm, preferably between 1 and 40 µm, more preferably between 3 and 30 µm, and have an average fiber diameter of greater than 2 µm, preferably greater than 5 µm, more preferably greater than 10 µm.

For an effective coalescing effect in the coalescing medium layer or layers, it is further added that the, or each, coalescing medium layer has a pore size range between 0.5 and 150 µm, preferably between 2 and 120 µm, and an average pore size of greater than 4 µm, preferably greater than 8 µm.

In order to achieve a good coalescing effect, it is further preferably provided that the, or each, coalescing medium layer has an MFP value (mean flow pore size) of greater than 8 µm, preferably greater than 12 µm, more preferably greater than 25 µm.

According to the present invention, it is further provided that the coalescing medium layer, or the configuration of a plurality of coalescing medium layers, has a porosity that is defined by an air permeability of less than 3000 l/m²s, preferably less than 2000 l/m²s, measured at a difference pressure of 200 Pa.

To ensure the desired functions of the filter insert according to the present invention, in many cases of application a single coalescing medium layer is sufficient. Alternatively, the filter material of the filter insert can also have a configuration of a plurality of coalescing medium layers, this configuration then preferably having two or three layers. The several coalescing medium layers are here usefully identical to one another.

The particle filter medium layer of the filter material of the filter insert can be made of standard materials for particle filtering; preferably, the particle filter medium layer is made of a filter paper or filter fleece or filter felt or filter nonwoven or filter woven fabric, or a sintered shaped element or filter element shaped element.

As mentioned above, the filter material is made up of a particle filter medium layer and at least one coalescing medium layer lying on the particle filter medium layer. Depending on the mechanical properties of the layers, it can be sufficient for the coalescing medium layer, or the configuration of a plurality of coalescing medium layers, to be placed loosely onto the particle filter medium layer. If a stronger bond between the layers is necessary or desired, then the coalescing medium layer, or the configuration of a plurality of coalescing medium layers, can be bonded to the particle filter medium layer, in particular glued onto the particle filter medium layer, or thermofixed or thermocalendered thereon.

As needed, a protective layer can be situated or attached at least on a surface, forming the downstream side, of the coalescing medium layer or layers, said protective layer forming a mechanical protection, e.g., against fraying or fuzzing of the coalescing medium layer or layers, without influencing the coalescing process.

In addition to the filter material body, the filter insert can have, in a known manner, end plates that enclose the filter material body and/or a support mesh that supports the filter material body at its downstream surface and protects it against collapse.

In addition, for the filter insert according to the present invention it is preferably provided that, seen in the direction of flow, a sieve is situated downstream from the filter material body, at a distance from it. The sieve carries out the final separation of the large water drops arriving there from the fuel, and the integration of the sieve in the filter insert ensures that every time there is a filter maintenance, when the filter insert is exchanged a fresh sieve is at the same time also installed in the associated filter.

In order to reliably retain the water drops arriving at the sieve without creating excessive flow resistance to the filtered fuel, it is provided that the sieve has a throughopening size between 5 and 200 μm, preferably between 10 and 100 μm, more preferably between 10 and 30 μm.

For the solution of the second part of the object of the present invention, relating to the fuel filter, a fuel filter is proposed for the separation of solid particles and water droplets from fuel.

Due to the small thickness of the filter material according to the present invention and the compact design thereby enabled of the filter insert according to the present invention, the filter insert can advantageously also easily be used in conventional fuel filters in the place of conventional filter inserts, without having to make constructive changes to the fuel filter, in particular to its housing.

BRIEF DESCRIPTION OF THE DRAWINGS

In the following, an exemplary embodiment of the present invention is explained on the basis of a drawing.

In the following description of the Figures, identical parts in the various Figures of the drawing are always provided with the same reference characters, so that all reference characters do not have to be explained again for each Figure.

DETAILED DESCRIPTION OF THE PREFERRED EMBODIMENTS

Figure 1:
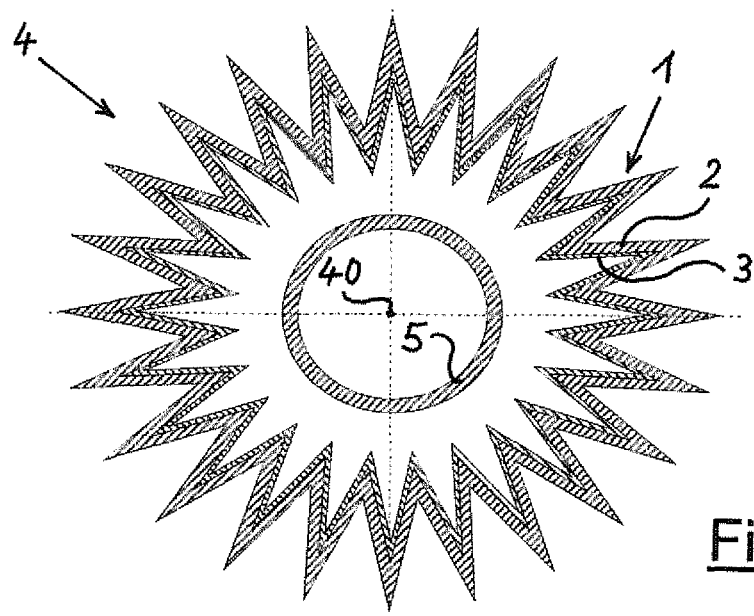
FIG. 1 shows a filter material body, folded in a star shape, forming part of a filter insert, made of a two-layer filter material together with a central sieve, in cross-section.

FIG. 1 of the drawing shows a hollow cylindrical filter material body 4, folded in the shape of a star symmetrically to a longitudinal mid-axis 40, made of a two-layer filter material 1, together with a central hollow cylindrical sieve 5, in cross-section. Filter material body 4 is a part of a filter insert, otherwise not shown here, for a fuel filter, and is used to separate solid dirt particles and water droplets from fuel, in particular diesel fuel, e.g., for supplying an internal combustion engine of a motor vehicle.

In the example shown in the drawing, during operational use of filter material body 4 the fuel flows from the outside to the inside through filter material 1.

A first, outer layer of filter material 1 is formed by a particle filter medium layer 2, e.g., made of a filter paper or filter fleece or filter felt or filter nonwoven or filter woven fabric. A first, standard function of particle filter medium layer 2 is to retain solid dirt particles carried along with the fuel to be filtered that have a size above a specifiable boundary size. A second function of this particle filter medium layer 2 is here to reduce the speed of movement of the water droplets carried along with the fuel to be filtered, and to already bring about a certain degree of coalescing of the water droplets, which, as has been surprisingly determined, also works with materials that are standard for particle filter medium layer 2. Through the particular selection of the material for particle filter medium layer 2, the coalescing effect of particle filter medium layer 2 can be further increased as needed without impairing the filtering function for solid particles that are to be separated.

A second, inner layer of filter material 1 is formed by a coalescing medium layer 3 that lies immediately on particle filter medium layer 2. Depending on the mechanical properties, here coalescing medium layer 3 can be placed loosely onto particle filter medium layer 2, or alternatively can be bonded to it, e.g., by gluing or thermofixing.

The function of coalescing medium layer 3 is to coalesce the water droplets carried along with the stream of fuel and that, in particle filter medium layer 2, are already larger than their original size, to form still larger drops of water that can be separated from the fuel, and then to drain these using the force of gravity, or to provide them with the stream of fuel for a subsequent separation at sieve 5, which is situated at a distance downstream from filter material body 4. For this purpose, coalescing medium layer 3 is usefully made of a material having adequate hydrophilicity, such as a meltblown nonwoven made of polyamide or polyester fibers, or alternatively of natural fibers.

For the functions named above, coalescing medium layer 3 need have only a relatively small thickness, which is smaller than the thickness of particle filter medium layer 2, or, as shown in the example, may even be significantly smaller than the thickness of particle filter medium layer 2, because particle filter medium layer 2 already performs part of the coalescing function for the water droplets. In the cooperation of particle filter medium layer 2 and coalescing medium layer 3 situated thereon, with regard to the effectiveness of the water separation a synergy effect occurs that goes significantly beyond the effectiveness that would be achieved given a configuration of an identical particle filter medium layer 2 and an identical thin coalescing medium layer 3 at a distance from one another.

Figure 2:
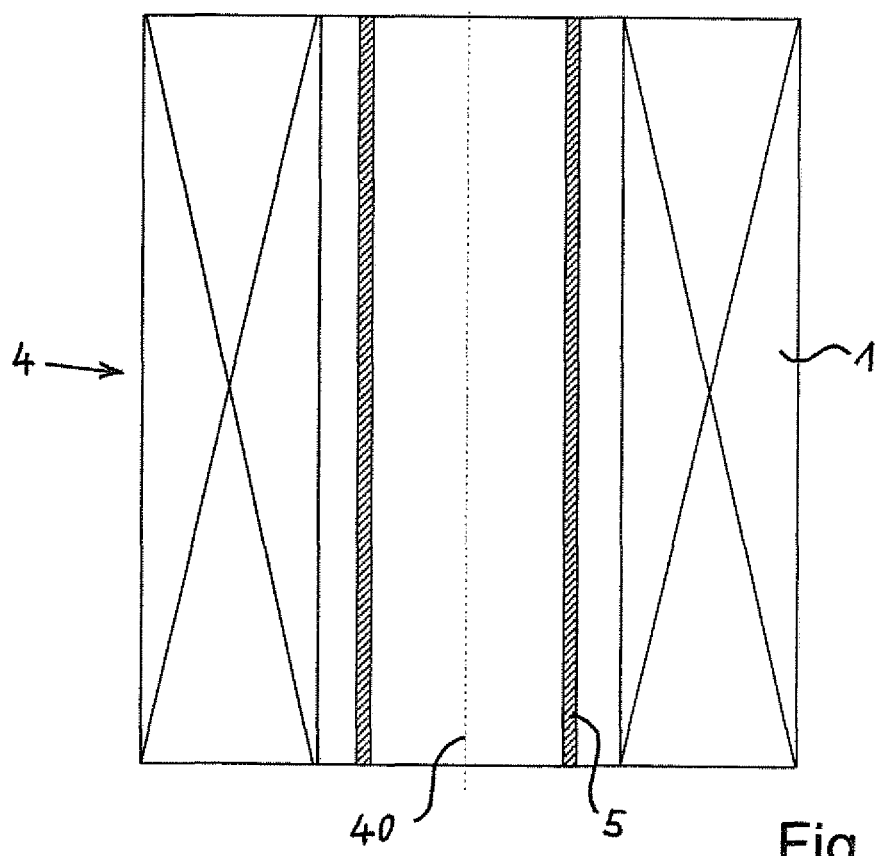
FIG. 2 shows the filter material body and the sieve of FIG. 1 in longitudinal section.

FIG. 2 shows filter material body 4 of FIG. 1, situated symmetrically to longitudinal mid-axis 40, made of filter material 1, in longitudinal section. Radially inwardly, hollow cylindrical sieve 5, also situated symmetrical to longitudinal mid-axis 40, is visible in longitudinal section.

During operational use, fuel that is to be filtered flows through filter material body 4 in the radial direction from the outside to the inside. Here, solid dirt particles carried along in the fuel to be filtered are retained in the particle filter medium layer 2 that is external in FIG. 1. The water droplets also carried along in the fuel to be filtered are decelerated in their speed of movement inside particle filter medium layer 2, and are coalesced to form already larger water droplets, and are then transferred to coalescing medium layer 3, situated internally on particle filter medium layer 2. In coalescing medium layer 3, which has a matching hydrophilicity, the water droplets are coalesced to form drops of water that are large enough that their separation from the fuel through gravity and/or at sieve 5 becomes possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A filter insert of a fuel filter for separating solid particles and water droplets from fuel, the filter insert comprising a single filter member having a filter material body made of a filter material, the filter material consisting of
　a single particle filter member and a single coalescing medium member,
　　the single particle filter member consisting of a particle filter medium layer, with an upstream side face through which the fuel first flows during use, and a downstream side face, and
　　a single coalescing medium member consisting of one or a configuration of a plurality of coalescing medium layers situated on the particle filter medium layer at the downstream side,
　　wherein the coalescing medium member has a specifiable minimum hydrophilicity, the degree of hydrophilicity corresponding, according to the water repellency test, to an isopropanol volume portion of no more than 25%,
　　the coalescing medium member being made without a gradient in the direction of flow with regard to at least one of its geometrical structure, its physical properties or its chemical properties,
　　the coalescing medium member having an overall thickness, measured in the direction of flow, that is smaller than an overall thickness, measured in the direction of flow, of the particle filter member,
　　the filter material being folded in a zigzag shape to form a hollow cylindrical or cuboidal body,
　　the coalescing medium member being made of synthetic fibers or a synthetic foam,
　　the coalescing medium member being made of hydrophilic fibers or a hydrophilic foam, and
　　the coalescing medium member being bonded to the particle filter medium layer.

2. The filter insert as recited in claim 1, wherein the coalescing medium member is made of at least one of a meltblown nonwoven, a wet-laid nonwoven, a woven fabric or a felt.

3. The filter insert as recited in claim 1, wherein the coalescing medium member is made without a gradient with regard to at least one of
　its fiber thickness,
　its fiber density,
　its porosity,
　its pore diameter,
　its air permeability,
　its permeability,
　a treatment,
　its surface energy, or
　its hydrophilicity.

4. The filter insert as recited in claim 1, wherein the coalescing medium member is made of synthetic fibers and hydrophilic fibers and the synthetic and hydrophilic fibers of the coalescing medium member have a fiber diameter between 0.3 and 50 μm, and have an average fiber diameter of greater than 2 μm.

5. The filter insert as recited in claim 1, wherein the coalescing medium member has a pore size range between 0.5 to 150 μm and has an average pore size of greater than 4 μm.

6. The filter insert as recited in claim 1, the coalescing medium member has a Mean Flow Pore Size value of greater than 8 μm.

7. The filter insert as recited in claim 1, wherein the coalescing medium member has a porosity that is defined by an air permeability of less than 3000 L/m$^2$s, measured at a difference pressure of 200 Pa.

8. The filter insert as recited in claim 1, wherein the single coalescing medium member has two or three layers.

9. The filter insert as recited in claim 1, wherein the particle filter medium layer is formed from one of
　a filter paper,
　filter fleece,
　filter felt,
　filter nonwoven fabric,
　filter woven fabric,
　a sintered shaped element, or
　a filter element shaped element.

10. The filter insert as recited in claim 1, wherein the coalescing medium member is at least one of
　glued,
　thermofixed, or
　thermocalendered to the particle filter medium layer.

11. The filter insert as recited in claim 1, wherein the coalescing medium member has a thickness between 0.1 and 1.5 mm.

12. The filter insert as recited in claim 1, wherein at a side, situated downstream, of the folded filter material, the coalescing medium member acts as a spacer between the folds of the particle filter medium member, with no portion of the downstream side face of the particle filter medium engaging any other portion of the downstream side face, of the particle filter medium.

13. The filter insert as recited in claim 1, wherein, in addition to the filter material body, the filter insert has a support mesh that supports the filter material body at its downstream surface.

14. A fuel filter for separating solid particles and water droplets from fuel, wherein the fuel filter has at least one filter insert as recited in claim 1.

15. A filter insert of a fuel filter for separating solid particles and water droplets from fuel, the filter insert comprising a sieve and a single filter member having a filter material body made of a filter material, the filter material consisting of a single particle filter member and a single coalescing medium member, the single particle filter member consisting of a particle filter medium layer, with an upstream side face through which the fuel first flows during use, and a downstream side face, and a single coalescing medium member consisting of one or a configuration of a plurality of coalescing medium layers situated on the particle filter medium layer at the downstream side, wherein the coalescing medium member has a specifiable minimum hydrophilicity, the degree of hydrophilicity corresponding, according to the water repellency test, to an isopropanol volume portion of no more than 25%, the coalescing medium member being made without a gradient in the direction of flow with regard to at least one of its geometrical structure, its physical properties or its chemical properties, the coalescing medium member having an overall thickness, measured in the direction of flow, that is smaller than an overall thickness, measured in the direction of flow, of the particle filter member, the filter material being folded in a zigzag shape to form a hollow cylindrical or cuboidal body, the coalescing medium member being made of synthetic fibers or a synthetic foam, the coalescing medium member being made of hydrophilic fibers or a hydrophilic foam, and the coalescing medium member being bonded to the particle filter medium layer, wherein, seen in the direction of flow, the sieve is situated downstream from the filter material body, at a distance from it.

16. The filter insert as recited in claim 15, wherein the sieve has a through-opening size between 5 and 200 µm.

* * * * *